(12) United States Patent
Arad

(10) Patent No.: US 11,902,821 B2
(45) Date of Patent: Feb. 13, 2024

(54) DYNAMIC FREQUENCY ALLOCATION METHOD

(71) Applicant: RAFAEL ADVANCED DEFENSE SYSTEMS LTD., Haifa (IL)

(72) Inventor: Dror Arad, Kiryat Ata (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 18/013,838

(22) PCT Filed: Mar. 25, 2021

(86) PCT No.: PCT/IL2021/050337
§ 371 (c)(1),
(2) Date: Dec. 29, 2022

(87) PCT Pub. No.: WO2022/003660
PCT Pub. Date: Jan. 6, 2022

(65) Prior Publication Data
US 2023/0199545 A1 Jun. 22, 2023

(30) Foreign Application Priority Data
Jun. 30, 2020 (IL) .......................................... 275784

(51) Int. Cl.
*H04W 28/02* (2009.01)
*H04W 28/08* (2023.01)
(Continued)

(52) U.S. Cl.
CPC ....... *H04W 28/0226* (2013.01); *H04W 16/10* (2013.01); *H04W 28/0967* (2020.05);
(Continued)

(58) Field of Classification Search
None
See application file for complete search history.

(56) References Cited

U.S. PATENT DOCUMENTS 6,157,840 A    12/2000   Hogberg et al.
10,231,245 B1 *   3/2019   Wang .................. H04W 72/542
(Continued)

FOREIGN PATENT DOCUMENTS

EP             3152956 A2    4/2017
WO    WO 1997/026717 A1    7/1997
(Continued)

OTHER PUBLICATIONS

PCT International Search Report and Written Opinion, PCT Application No. PCT/IL2021/050337, dated Jun. 13, 2021, 10 pages.
(Continued)

*Primary Examiner* — Saba Tsegaye
(74) *Attorney, Agent, or Firm* — Fenwick & West LLP

(57) ABSTRACT

A process for determining frequency allocations for efficient spectrum management and reuse, in communication between multiple users of moving platforms and ground stations using directional antennas, comprises: (a) generating a preferential ranking list; and (b) repeatedly recalculating desirable frequency allocations for communication between platforms and stations according to said preferential ranking list and user-to-user interference data.

15 Claims, 5 Drawing Sheets

Directional Antenna Plot:

(51) Int. Cl.
*H04W 16/10* (2009.01)
*H04W 72/0453* (2023.01)
*H04W 72/541* (2023.01)
*H04W 72/543* (2023.01)

(52) U.S. Cl.
CPC ..... *H04W 72/0453* (2013.01); *H04W 72/541* (2023.01); *H04W 72/543* (2023.01)

(56) References Cited

U.S. PATENT DOCUMENTS

| | | |
|---|---|---|
| 2015/0236778 A1 | 8/2015 | Jalali |
| 2016/0380692 A1* | 12/2016 | Jalali ............... H04W 24/10 455/11.1 |
| 2017/0325221 A1* | 11/2017 | Jalali ............... H04W 16/28 |
| 2018/0097560 A1* | 4/2018 | Jalali ............... H01Q 1/28 |
| 2019/0230671 A1 | 7/2019 | Kim et al. |

FOREIGN PATENT DOCUMENTS

| | | |
|---|---|---|
| WO | WO 02/063798 A1 | 8/2002 |
| WO | WO 2018/067862 A1 | 4/2018 |

OTHER PUBLICATIONS

PCT International Preliminary Report on Patentability, PCT Application No. PCT/IL2021/050337, dated Dec. 25, 2022, 7 pages.
Extended European Search Report, European Patent Office Application No. 21832157.8, dated Nov. 24, 2023, 7 pages.

\* cited by examiner

DYNAMIC FREQUENCY ALLOCATION METHOD

FIELD OF THE INVENTION

The present invention relates to a method for optimizing spectrum management and reuse in scenarios involving communication between multiple users of moving platforms and ground stations using directional antennas.

BACKGROUND OF THE INVENTION

Spectrum resources are a crucial resource in communication networks today, where the bitrate demand is constantly increasing, and has a crucial impact on user experience and system performance. In real-life scenarios with increasing number of end-users, it becomes more difficult to find simple ways to share the spectrum bandwidth between end-users. This is also true in communication between stationary to fast moving end-points, such as ground stations to airborne platforms and vice versa. Analogously, cellphone networks overcome this difficulty by using a network of widely spread ground stations with pre-set regional frequency spectra. This way, the same frequencies can be reused in different locations as long as those locations are far enough so as not to interfere with one another.

The cellular method is not suitable for all applications. As the number of aerial applications in communications increases, demanding higher capacity and throughput, greater frequency restrictions arise. To the extent that aerial technology is progressing, there is a pressing need to utilize a more sophisticated bandwidth usage. The method of the present invention solves a number of outstanding limitations in the field of communication, as explained herein. As used herein, "moving platforms or entities" refers to any user platform that moves relative to a ground station, e.g., any airborne platform, but is not limited thereto. Entities may not necessarily be aerial platforms. Platforms can include, but are not limited to, planes, helicopters, drones or cars that communicate with a ground station in a line of sight communication. Herein, the terms interruption, interference and disruption will be used interchangeably to refer to any transmitted or received signal that has a frequency interference due to superposition between two or more communication signals.

The spectrum allocation challenge becomes even more complicated when dealing with ground stations communicating with moving platforms, since the communication characteristics change and evolve, and may cause competition between them. For example, in a scenario in which military planes are entering an enemy zone, uninterrupted communication with home bases is essential.

Frequency spectra and bandwidths should be allocated such that the Total Used Spectral Bandwidth or Reuse Factor is maximized. The definition of the Total Used Spectral Bandwidth is the sum of spectral occupation of all the links.

$$\text{Total Used Spectral Bandwidth} = \sum_{n=1}^{N} S(n)$$

Where N is the number of links, and S(n) is the Spectral Bandwidth allocated to a specific link.

The Reuse Factor=Total Used Spectral Bandwidth/Allocated Spectrum.

Additionally important requirements for the dynamic frequency allocation process are:
1. The ability to take into account a prioritization between the platforms;
2. Reducing the computational resources required for maintaining the allocation process.

The invention relates to a method that overcomes these challenges by managing frequency allocations and bandwidths between any number of ground stations and moving platforms or entities. These allocations are assigned in real-time to account for changes in the signal to interference (S2I) between all platforms in use. The process according to this method allocates the frequency and bandwidth according to a list of preferences. This frequency allocation method yields maximal reuse factors, with minimal computational demand, taking into account all S2I of the system and a preferential ranking, to be discussed hereinafter.

The preferential rankings list is set by an administrator and reflects the requirement to ensure the least interrupted communication and higher capacity for the highest priority platforms. For example, the following examples may be higher on a rankings list: a platform that is serving a preferred user, a platform with a demanding sensor, or a platform that is locked on to a top priority target. In the context of the present invention, the term "administrator" should be interpreted broadly, to include both automated administration, such as may be by a computer system operating according to preset criteria, or a human administrator that inputs ranking lists generated according to a set of criteria, or a combination in which a human administrator may intervene in the rankings determined by an automated system.

SUMMARY OF THE INVENTION

The invention relates to a process for determining frequency allocations for efficient spectrum management and reuse, in communication between multiple users of moving platforms and ground stations using directional antennas, comprising:
  (a) generating a preferential ranking list; and
  (b) repeatedly recalculating preferred frequency allocations for communication between platforms and stations according to said preferential ranking list and user-to-user interference data.

In one embodiment of the invention the process comprises generating a dynamic user-to-user interference matrix that updates in real-time.

According to several alternative embodiments of the invention the input to the process is selected such that it comprises one or more of:
  1) Available frequency spectrum bandwidths;
  2) The desired utilization order of frequencies spectrums and bandwidths;
  3) Platform priority ranking;
  4) Geographic locations of ground stations;
  5) Platforms to ground-stations assignments;
  6) Location of moving platforms and their velocity;
  7) Spatial gains of directional antennas used;
  8) Possible bandwidth occupancies of the modems used; and
  9) The same static and dynamic information from external neighboring systems allowing to exploit their spectrum when possible According to further embodiments of the invention the output of the process comprises one or more of:
a) Frequency allocation for each link; and
b) Bandwidth allocation for each link.

In some embodiments the ground stations and platforms communicate via up-link and down-link channels, and the two links share the same frequency spectra. In other embodiments of the invention the ground stations and platforms communicate via up-link and down-link channels, and the two links do not share the same frequency spectra. The links may operate independently and the process can be carried out for the up-link allocations and for the down-link allocations independently.

According to an embodiment of the invention the frequency allocations size is selected from a group of pre-defined sizes, which group enables selections such that no gaps are left between the members of the group after assignment or release of an allocation. The group of pre-defined sizes may, in some embodiments, consist of sizes that are multiples of a base size.

In some embodiments of the invention ground stations and moving platforms are paired according to predefined criteria, and in other embodiments of the invention they are randomly paired.

According to a specific embodiment of the invention the process further comprises, for each platform and ground station, generating a table of 'platform viewed angle' and 'platform viewed RSSI' (Received Signal Strength Indication) based on the locations and direction of the antenna patterns. In yet another embodiment the process further comprises computing the signal-to-interference ratio between ground stations and moving platforms. The interference ratio can be obtained, for example, by subtracting the Viewed RSSI of the disturber from the Viewed allocated platform RSSI. The process may further comprise generating an interference Boolean matrix including information regarding which platforms would interfere with each other, if using the same frequency channel.

DETAILED DESCRIPTION OF THE INVENTION

Figure 1:
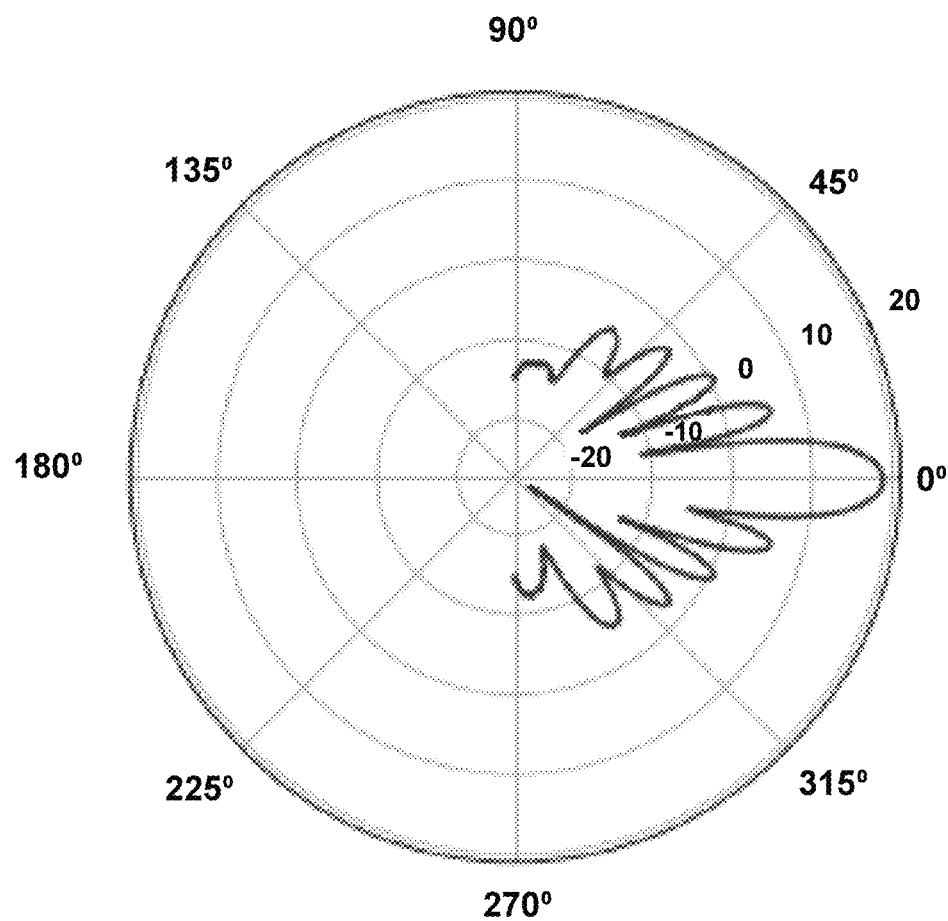
FIG. 1 is an example of a directional antenna plot (in dBi)

The present invention relates to a simple, effective and easily implementable method, for spectrum allocation and reuse, for users that utilize highly directional antennas. The process is flexible and includes the capability of multiple inputs and user constraints. The method is based on tracking directional antennas the beams of which can be directed mechanically or electronically, from the user-end (i.e., moving platform and ground stations), such as a directional antenna the profile of which is shown in FIG. 1. In one embodiment of the invention, the process can run independently of user intervention once threshold parameters are set.

A process and preferential ranking list are used to determine a desired frequency allocation according to the needs of the system, user and/or administrator for any given scenario. The process allocates links repeatedly and requires very low computational resources, each time recalculating a desirable frequency allocation for communication between platforms and/or entities. This determination is facilitated by a dynamic user-to-user interference matrix that updates in real-time.

As will be apparent to the skilled person from the description hereof, the invention also allows a system to exploit unused spectrum from other neighboring systems that do not use it, but rather just inform or share their status information.

The following are illustrative and non-limitative examples of inputs to the process:
1. Frequency spectrum bandwidths available;
2. Frequency spectrum and bandwidths utilization order;
3. Platform priority ranking;
4. Geographic locations of ground stations (e.g., latitude, longitude, altitude);
5. Location of moving platforms and their orientation and velocity;
6. Spatial gains of directional antennas that are being used;
7. Possible bandwidth occupancies of the modems used;
8. Information from neighboring systems (inputs 4-6);

Illustrative and non-limitative examples of process outputs include:
1. Frequency allocation for each link;
2. Bandwidth allocation for each link.

Figure 2:
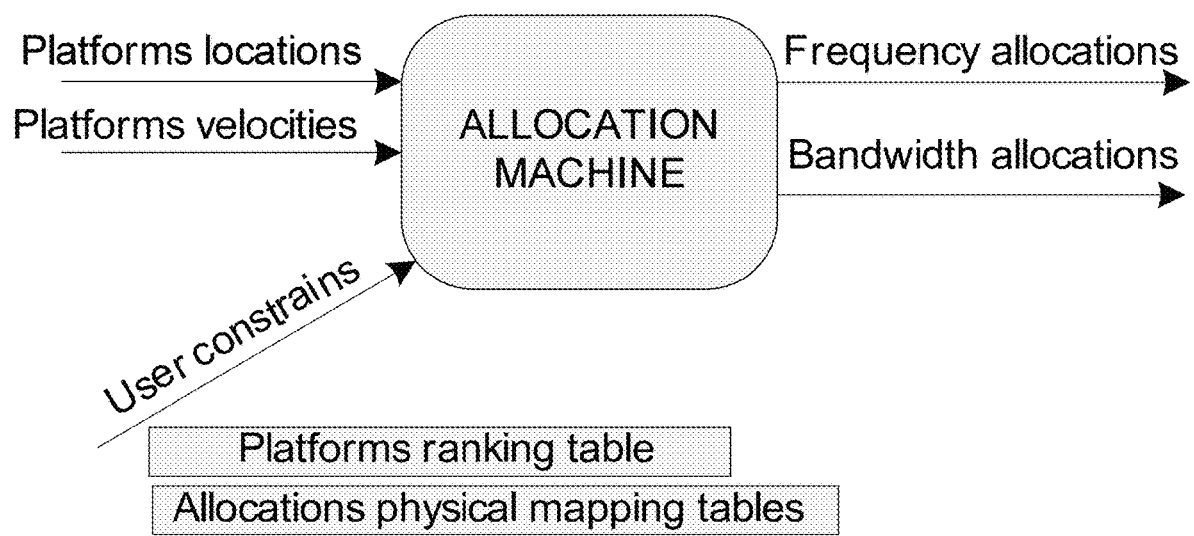
FIG. 2 is a schematic representation of the inputs and outputs of the process.

FIG. 2 illustrates an allocation step showing some of the basic inputs and outputs according to an embodiment of the invention. The process of the invention can employ circuitry, which receives and calculates additional inputs and performs ground station to platforms matching.

The process can operate in different communication scenarios, for example:
1) Between moving platforms and the ground stations that communicate via up-link and down-link channels;
2) The up-link and down-link may share the same spectrum, or have separated spectrum allocations;
3) For this example: Assuming that links operate independently, the process is carried out once for the up-link and once for the down-link. For the sake of simplicity, the illustrative examples that follow relate to allocation of the down-link alone.

Figure 3:
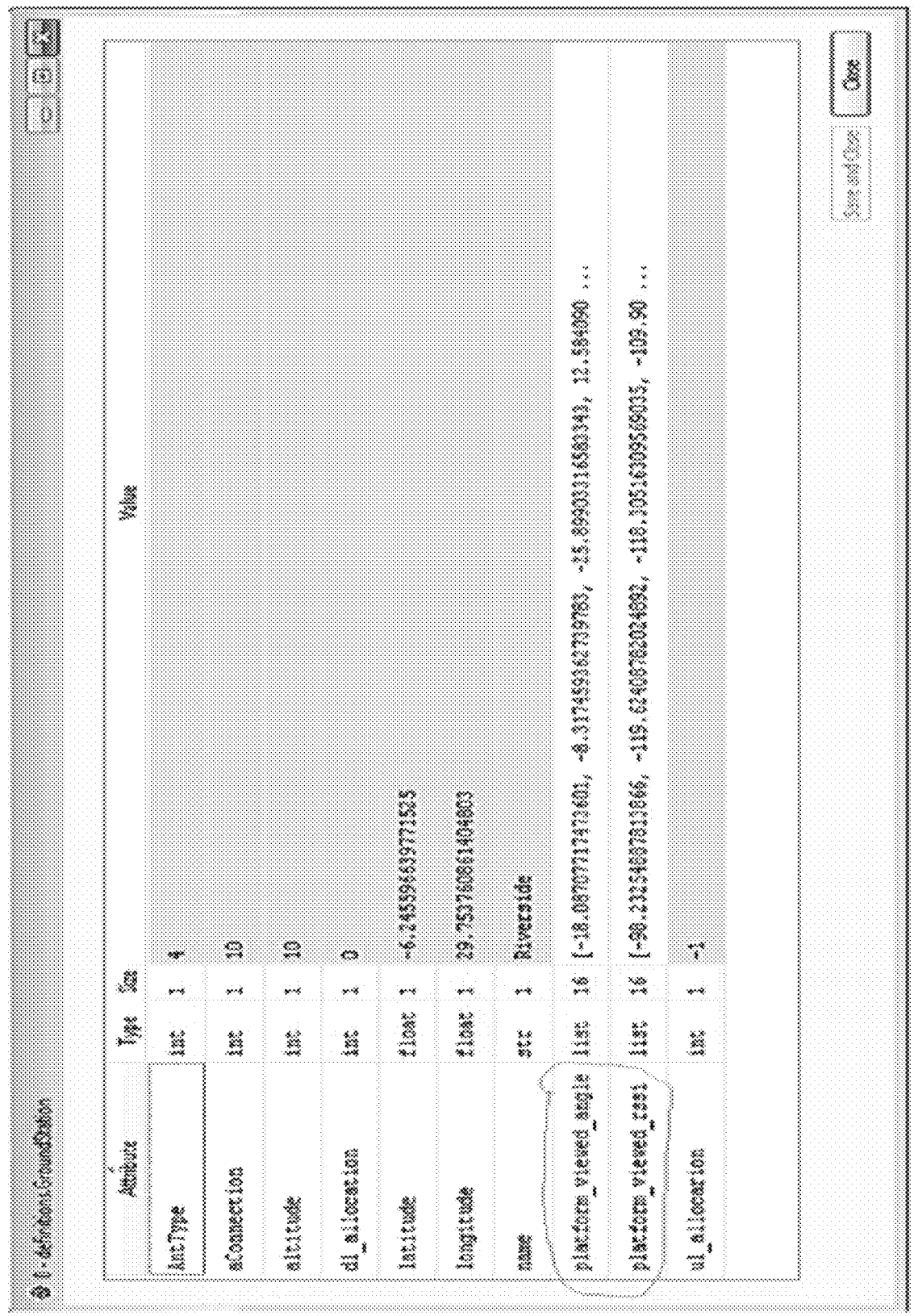
FIG. 3 shows a table of inputs for the process.

The process consists of the following steps:
Pre-requisites and assumptions:
1. Generate a set of spectral occupancies (bandwidths) of different sizes for communication modems. The preferred size of the bandwidths enables easy selections such that no gaps are left between them. This can be typically done by selecting sizes that are multiples of a base size. An example of such a set is: 1 MHz, 5 MHz, 10 MHz, 15 MHz, 20 MHz, 30 MHz, 40 MHz, 50 MHz, 100 MHz;
2. Later on, when a link is specified to bandwidth, it may be exploited in an optimized way by using an Adaptive Coding & Modulation (ACM) algorithm;
3. "Allocation," as used in the context of this invention, is defined as a set of frequency and bandwidth. Platforms that use the same "Allocation" must be "spatially orthogonal," otherwise they will interfere with each other.
4. The user creates tables that maps the physical frequency and bandwidth of each allocation. The tables are defined specifically for each case, based on expected number of required allocations (allocations physical mapping tables);
5. A pre-defined threshold is set, which determines what absorption intensity is considered to be an interference. This margin may take into account the fact that statistically there are several interferers, thus effectively reducing the calculations needed. An illustrative example of how a threshold can be defined is by taking sensitivity+6 dB+ plus propagation dif. Margin plus additional margin that takes into account that there is more than one disturber;
6. A platforms ranking table is provided;
7. The scene consists of moving platforms and ground-stations linked together. Platforms may enter or leave the scene dynamically;
8. Ground stations and moving platforms are paired, either randomly or according to a predetermined criterion;

Process Steps:

As explained hereinbefore, the following process description relates only to the downlink for the sake of brevity. As will be apparent to the skilled person, this process is applicable symmetrically for the uplink.
1. For each ground station a table of 'platform viewed angle' and 'platform viewed RSSI' (Received Signal Strength Indication) is built upon the locations and direction of the antenna beams. An example of such a table is shown in FIG. 3;
2. The signal to interference ratio between every ground station and platform is calculated for each ground station, for instance by computing the Viewed paired platform RSSI minus Viewed RSSI of the disturber;
3. An interference Boolean matrix is generated according to the threshold as defined hereinbefore. This matrix marks which platforms interfere with each other, if using the same frequency channel;
4. "Allocations" (as defined above) are made according to the interference. The same allocation can be given unlimitedly to links that do not interfere with each other (reuse). Each allocation will later be assigned with a specific frequency and bandwidth (a channel);
5. The allocations are made according to a rankings table, such that, for instance, the platform with the highest preference in the rankings table is given the first allocation, the one coming after that in the table is given the second allocation, and so on.
6. The process goes through all platforms according to the rankings list (from highest to lowest rank), for the purpose of assigning the highest ranked platform the first (i.e., best) allocation. The best allocation is considered to be one that either has the largest bandwidth, or one that has a frequency that has the lowest chance of being interfered by other systems. The process then checks if this allocation is already occupied by another platform that interferes (or in itself disrupts this platform) by checking the interference matrix. In the case where the assignment is not occupied by an interfering platform (or in itself disrupts that platform), the allocation is assigned. In a case where it is already occupied, the process moves on to the next allocation and the interference conditions are checked again, and so on.
7. This process (steps 1-6) runs repeatedly at preset time intervals (e.g. every 10 seconds). In order to ensure that allocations will still hold until a new allocation cycle in done, an extrapolation is carried out for that time period until the next frequencies and bandwidths are allocated. The extrapolation is used to predict where the locations of the moving platforms will be until next the allocation update (using the current location and velocity). The interference matrix mentioned above is also calculated for the extrapolated locations. The periodic cycle should be short enough to ensure that changes in velocity during this period are negligible. As will be apparent to the skilled person, the cycle period depends on the type of platform and platform speed. "Platform speed" as used herein refers to the moving speed of the platform;
8. After generating the allocations, channels (specific frequency and bandwidth) are assigned (or mapped) according to a pre-defined table, as explained hereinbefore, to each allocation.

Example for Possible Assignments:
a. If one allocation is required, the frequency range can be defined as 3.3 GHz to 3.4 GHz i.e., with a bandwidth of 100 MHz;
b. If two allocations are required (as a result of the process described above), the first channel can occupy 70 MHz at 3.3 to 3.37 GHz and the second 30 MHz at 3.37 to 4 GHz;
c. If three allocations are required, the bandwidth can be split in to 70 MHz, 20 MHz, 10 MHz at pre-designated frequencies within the range 3.3 GHz to 3.4 GHz, etc.

Figure 4:
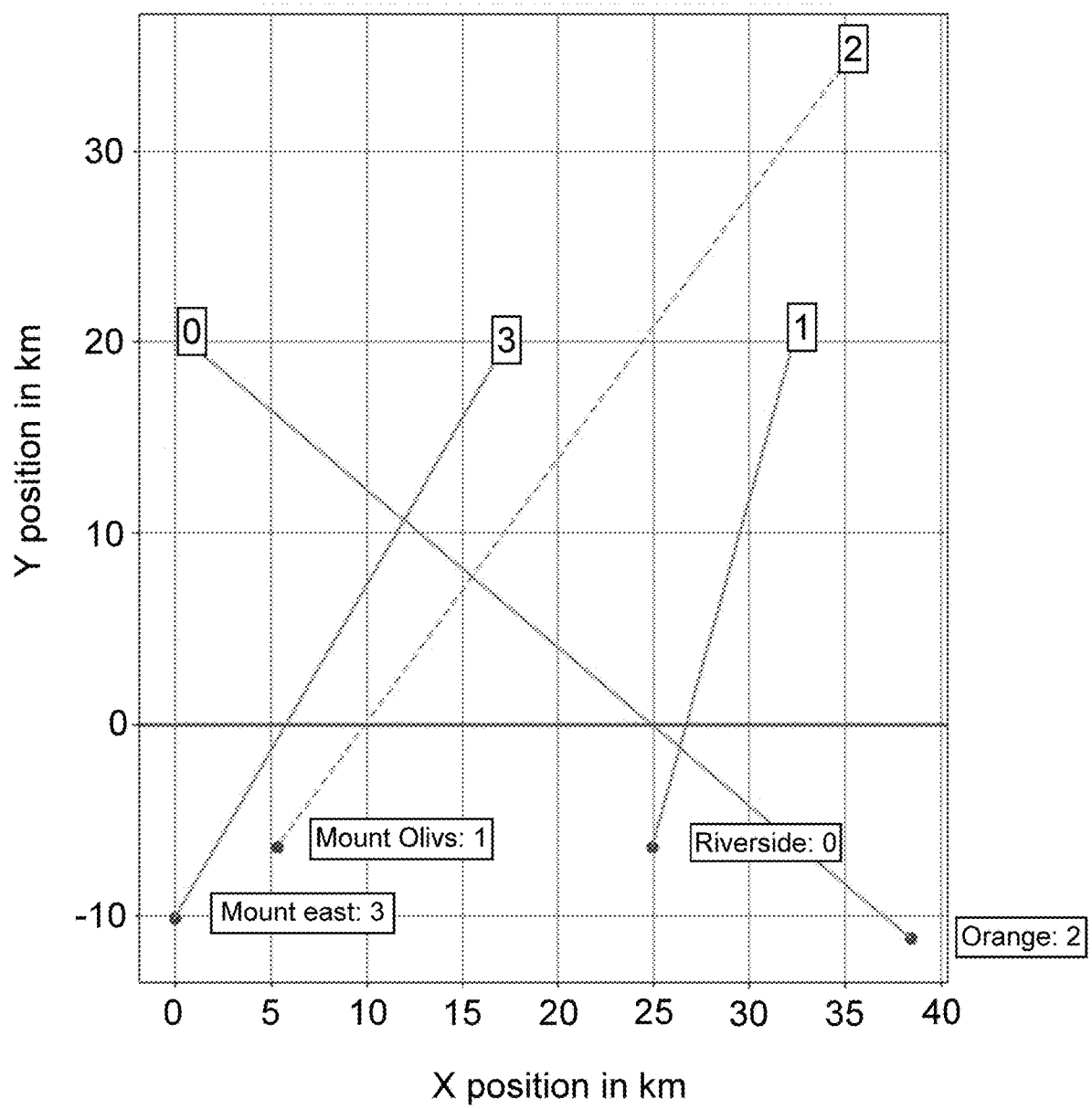
FIG. 4 shows a grid plot of a scenario involving 4 links, 4 moving platforms, and 4 ground stations located on 4 different sites.

An example of a scenario where the method of this invention can be implemented is shown in FIG. 4. In the scenario 4 links (dotted lines) connect 4 moving platforms (squares) to 4 ground stations in 4 bases (rounded rectangles) and require only two frequency allocations (allocation 1=light gray line, allocation 2=darker), i.e., In this case it is the minimum number of frequency allocations needed to avoid interference.

The disturbances depicted in the scenario in FIG. 4 are:
Down Link from platform 1 to ground station 0 (Riverside) is Disturbed By Down Link from platform 2 to ground station 1 (Mount Olives)
Allocations: [0, 0, 1, 0]
For platforms: [3, 1, 2, 0]
Priority list: [3, 1, 2, 0]

Figure 5:
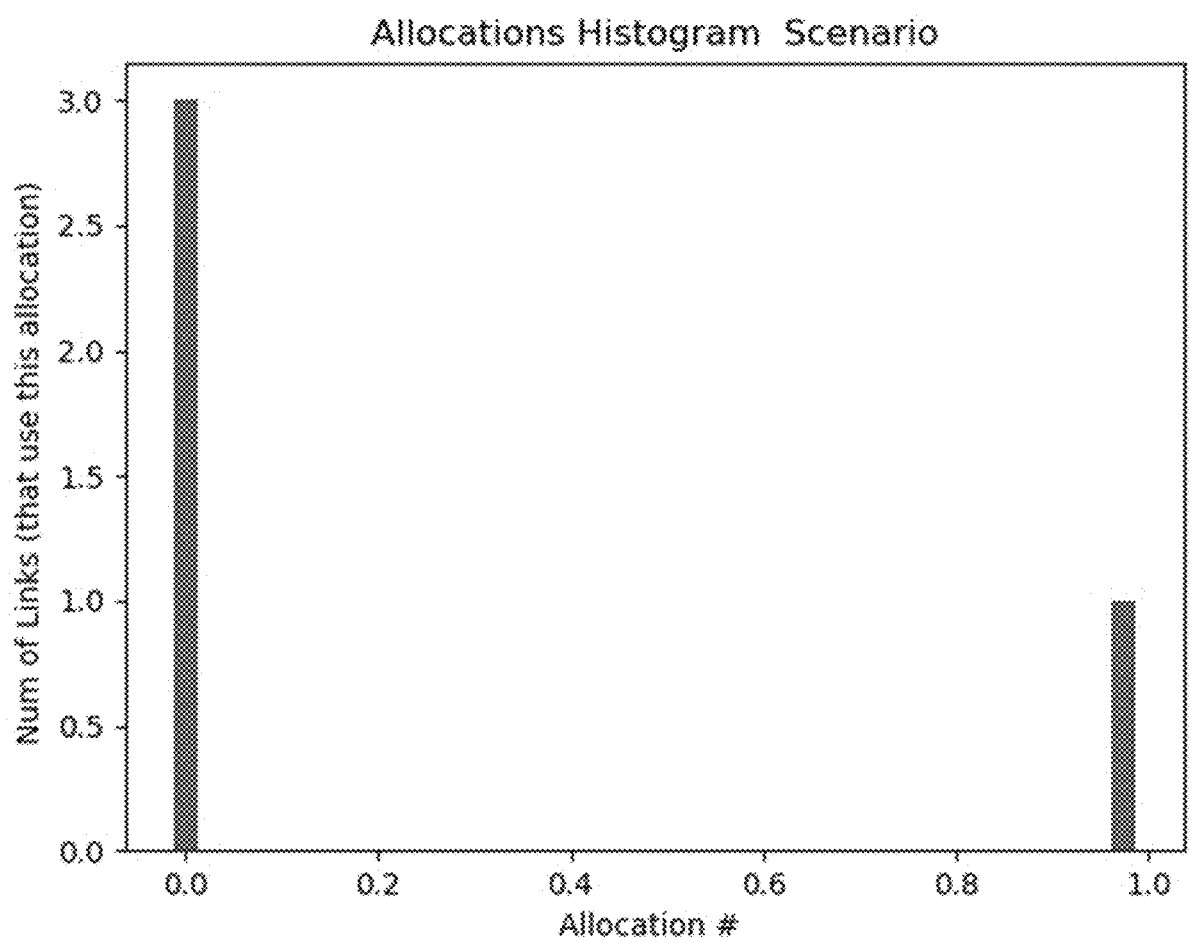
FIG. 5 shows a histogram depicting the frequency allocations of the scenario of FIG. 4.

To illustrate the advantages of the present invention, the average bandwidth used for this scenario can be compared between the present invention with that of simply dividing the frequency bandwidth allocations equally amongst links. By dividing the 100 MHz bandwidth without a reuse, each link would receive a 25 MHz bandwidth (i.e., 100/4=25 MHz). However, using the method of frequency allocation of this invention, 3 of the users receive 70 MHz and 1 user receive 30 MHz. Therefore, the average bandwidth used for communication using the method of the present invention is 60 MHz (i.e., (70×3+1×30)/4=60 MHz). This frequency allocation is depicted in the histogram in FIG. 5. Using the method of the present invention yields a reuse factor of 60/25=2.4 for this example.

The method of this invention brings the spectrum reuse field, which is the basis of the modern cellular communications, to new areas where highly directional antenna's spatial properties are exploited. The method maximizes the spectrum reuse factor and considers user preferences and constraints with minimal computational requirements.

All the above examples have been provided for the purpose of illustration and are not intended to limit the invention on any way. As will be understood by the skilled person, the invention allows for many alternatives and modifications. For instance, different bandwidths sizes can be used, as can be different criteria for generating preferential priority lists, all without exceeding the scope of the invention.

The invention claimed is:

1. A process for determining frequency allocations for efficient spectrum management and reuse, in communication between multiple users of moving platforms and ground stations using directional antennas, comprising:
   (a) generating a preferential ranking list; and
   (b) repeatedly recalculating desirable frequency allocations for communication between platforms and stations according to said preferential ranking list and user-to-user interference data.

2. A process according to claim 1, wherein the user-to-user interference data is a matrix that updates in real-time.

3. A process according to claim 1, wherein an input to the process comprises one or more of:
   1. Available spectral bandwidths;
   2. The desired order of utilization of frequencies and bandwidths;
   3. Platform priority ranking;
   4. Geographic locations of ground stations;
   5. Platforms to ground-stations assignments;
   6. Location of moving platforms and their velocity;
   7. Spatial gains of directional antennas used;
   8. Possible bandwidth occupancies of the modems used; and
   9. Information regarding unused spectrum from external neighboring.

4. A process according to claim 1, wherein an output of the process comprises one or more of:
   a) Frequency allocation for each link; and
   b) Bandwidth allocation for each link.

5. A process according to claim 1, wherein the ground stations and platforms communicate via up-link and down-link channels, and wherein the two links share at least some of the same frequency spectra.

6. A process according to claim 1, wherein the ground stations and platforms communicate via up-link and down-link channels, and wherein the two links do not share the same frequency spectra.

7. A process according to claim 6, wherein the links operate independently and the process is carried out for the up-link allocations and for the down-link allocations independently.

8. A process according to claim 1, wherein the frequency allocations size is selected from a group of pre-defined sizes, and wherein said group enables selections such that no gaps are left between the members of the group after assignment or release of an allocation.

9. A process according to claim 8, wherein said group of pre-defined sizes consists of sizes that are multiples of a base size.

10. A process according to claim 1, wherein ground stations and moving platforms are paired according to predefined criteria.

11. A process according to claim 1, wherein ground stations and moving platforms are randomly paired.

12. A process according to claim 1, further comprising, for each platform and ground station, generating a table of 'platform viewed angle' and 'platform viewed RSSI' (Received Signal Strength Indication) based on the locations and direction of the antenna patterns.

13. A process according to claim 12, further comprising computing a signal-to-interference ratio between ground stations and moving platforms.

14. A process according to claim 13, wherein the interference ratio is obtained by subtracting the Viewed RSSI of the disturber from the Viewed allocated platform RSSI.

15. A process according to claim 13, further comprising generating an interference Boolean matrix including information regarding which platforms would interfere with each other, if using the same frequency channel.

* * * * *